Patented Oct. 8, 1935

2,016,791

UNITED STATES PATENT OFFICE 2,016,791

YEAST

Henry Riley, deceased, late of Kearny, N. J., by Edith M. Riley, administratrix, Kearny, N. J.

No Drawing. Application December 5, 1934, Serial No. 756,085

2 Claims. (Cl. 195—20)

This invention relates to yeasts, and more particularly to a process of making a seed yeast more economically and quicker than has heretofore been possible, by any of the known processes.

Heretofore, the manufacture of seed yeast has required the services of experienced chemists following strictly the old methods devised by Pasteur, Hansen and Linden, of isolation and drop cultures, without ever producing a pure product.

It is an object of the invention to provide in the manufacture of seed yeast, a process of hastening the sporulation of yeast, at the same time retard the action of mold spores which might contaminate the yeast due to the hastening of the sporulation.

A further object is the provision of an improved process of making seed yeast from sporulated yeast to obtain at a realtively low cost and rapidly, a product highly superior to any which may be produced by processes heretofore known.

In accordance with the process, yeast is mixed with an aerated saturated solution of calcium sulphate, resulting in an increase in the sporulation of the yeast. For example, there was mixed with about 5 ozs. of water, about 12 ozs. of a material such as finely powdered calcium sulphate. The mixture was then strongly and thoroughly agitated until a white aerated cream was formed, after which pure water was added at the rate of about 5 ozs. at intervals over a space of time of about thirty minutes until about 30 ozs. of water had been added. Thus was formed a cream which is highly aerated, greatly increased in volume, and a mass of air bubbles.

This highly aerated mass or cream was then mixed thoroughly with about 4 lbs. of yeast, for example, although any proportions of yeast may be used. If the yeast was used in the proportions indicated and separated from the wort, there was then preferably added ½ of 1% of corn starch, which assisted in stimulating the sporulation.

When the yeast was mixed with the saturated solution of calcium sulphate, noticeable changes took place. The yeast, comprising mostly vegetable cells, gives up some of its moisture content and starts to form durable cells and begin to sporulate immediately. After the yeast had been 30 hours in the incubator at 28° C., this durable yeast was then diluted with more aerated water, allowing it to stand for about 18 more hours at 28° C. The durable yeast had thick walls and its contents were rich in glycogen and fats, and was similar to the sporulated yeast; and at the end of 48 hours, the yeast would consist of sporulated yeast and durable yeast.

The saturated calcium sulphate cream not only stimulates the sporogenic function of the yeast, but also retards the contaminating action of mold spores resulting from the rapidity of the sporulating action.

Sporulation is a form of resistance which allows the yeast to remain viable. It plays an important part in the hibernations of yeasts.

Then about 25 gallons of clarified molasses containing about 49% sugar was reduced by the addition of water to 11° Balling, to serve as a nutrient medium. About 25% of this nutrient medium was placed in a receptacle and water was added to the receptacle until the strength of the nutrient medium in the receptacle was about 2° Balling, approximately 200 gallons of water being required for this purpose.

To this nutrient medium in the receptacle having a strength of 2° Balling was then added the sporulated yeast prepared as above described, and the mixture was maintained at about 28° C. for about 12 hours, the remainder of the 25 gallons of the nutrient medium being gradually added until all of the ascospores had germinated.

At the same time the nutrient medium was being gradually added, there had been found that desirable results could be obtained by gradually adding autolized yeast prepared by the method described in U. S. Letters Patent #1,519,801, issued on December 16, 1924.

While the nutrient medium may be added all at one time, there had been found that the gradual adding of the nutrient medium gives a larger yield and enables better control.

A portion of the yeast thus prepared, about four pounds as in the above example, may then be mixed with an aerated calcium sulphate cream to cause sporulation for the purpose of making another bath of seed yeast as hereinbefore described.

By means of this process, seed yeast could be prepared at a considerable less cost and in less time than has heretofore been possible with other processes; at the same time a more effective used yeast was produced. For example, four pounds of sporulated yeast prepared according to this process was equivalent in effect to 620 pounds of seed yeast prepared by other processes.

Not only does the calcium sulphate retard the infection of infected micro-organisms, but the quantity of the sporulated yeast is so large that it helps to overcome the infection.

In laboratories before a yeast being investigated is sporulated, it is necessary to rejuvenate the yeast, but with this process, it was not necessary to rejuvenate the yeast, as any vegetable yeast cell will sporulate under this method.

Oxygen is essential for sporulation, and this was taken care of by the air bubbles in the aerated calcium sulphate. Temperature plays an important part. Below 20° C. a longer time was required for sporulation and 35° C. appeared to be the maximum temperature for satisfactory results.

Mycoderma yeast, which may exist in and contaminate the yeast desired to sporulate, does not sporulate. Only vegetable yeast cells at the above temperatures will sporulate; and it was desirable to have as little as possible of mycoderma yeast because it propagated so fast and took a lot of fermentation power from the desirable yeast.

From the above description it will be seen that there was provided an effective method of preparing seed yeast with a great saving of time and money.

While the foregoing was generally descriptive of the process employed and ingredients used, it was to be understood that the same may be modified in minor respects, in proportion, time periods and that the substitution of equivalents for the mentioned mineral salts may be made without departing from the spirit and scope of the invention as recited in the appended claims.

Having thus described this invention what is claimed as new and desired to secure by Letters Patent is:

1. In the manufacture of a seed yeast for making a commercial yeast, sporulating yeast by mixing approximately four pounds yeast with an aqueous aerated cream formed by agitating approximately 12 ounces of calcium sulphate with water, adding approximately ½ of 1% corn starch to the mixture, maintaining the mixture at a temperature approximately 28° C. for approximately 30 hours, then further diluting the mixture with aerated water, and then allowing the mixture to stand for approximately 18 hours to produce sporulated yeast and durable yeast.

2. In the manufacture of a seed yeast for making a commercial yeast, sporulating yeast by mixing approximately four pounds yeast with an aqueous aerated cream formed by agitating approximately 12 ounces of calcium sulphate with water, adding approximately ½ of 1% corn starch to the mixture, maintaining the mixture at a temperature approximately 28° C. for approximately 30 hours, then further diluting the mixture with aerated water, allowing the mixture to stand for approximately 18 hours to produce sporulated yeast and durable yeast, and then propagating the yeast in a nutrient medium at a temperature favorable to complete germination of the ascospores for approximately twelve hours.

EDITH M. RILEY,
*Administratrix of the Estate of Henry Riley.*